United States Patent
Finke et al.

(10) Patent No.: US 10,900,374 B1
(45) Date of Patent: Jan. 26, 2021

(54) TRANSMISSION SHIFT CONTROL METHOD FOR REDUCED TORQUE TRANSIENTS

(71) Applicant: Hamilton Sundstrand Corporation, Charlotte, NC (US)

(72) Inventors: Aaron M. Finke, Janesville, WI (US); Stephen Michael Bortoli, Roscoe, IL (US); Jonathan C. Dell, Elgin, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/539,778

(22) Filed: Aug. 13, 2019

(51) Int. Cl.
| | | |
|---|---|---|
| *F01D 15/10* | (2006.01) | |
| *F02C 7/32* | (2006.01) | |
| *F16D 21/00* | (2006.01) | |
| *F16H 3/02* | (2006.01) | |
| *H02P 9/06* | (2006.01) | |
| *H02P 101/25* | (2016.01) | |

(52) U.S. Cl.
CPC ............. *F01D 15/10* (2013.01); *F02C 7/32* (2013.01); *F16D 21/00* (2013.01); *F16H 3/02* (2013.01); *H02P 9/06* (2013.01); *F05D 2220/3217* (2013.01); *F05D 2220/74* (2013.01); *F16H 2200/00* (2013.01); *H02P 2101/25* (2015.01)

(58) Field of Classification Search
CPC . F01D 15/10; F02C 7/32; F16D 21/00; F16H 3/02; F16H 2200/00; H02P 9/06; H02P 2101/25; F05D 2220/3217; F05D 2220/74
See application file for complete search history.

(56) References Cited

U.S. PATENT DOCUMENTS

| | | | |
|---|---|---|---|
| 7,942,079 B2 | 5/2011 | Russ | |
| 8,876,650 B2* | 11/2014 | Lemmers, Jr. ............ | F02C 7/36 475/259 |
| 10,328,799 B2 | 6/2019 | Duong | |

(Continued)

FOREIGN PATENT DOCUMENTS

| | | |
|---|---|---|
| EP | 2796314 A1 | 10/2014 |
| EP | 3540198 A1 | 9/2019 |

OTHER PUBLICATIONS

European Search Report Application No. 19215827.7; dated Jul. 3, 2020; pp. 7.

*Primary Examiner* — Tulsidas C Patel
*Assistant Examiner* — Joseph Ortega
(74) *Attorney, Agent, or Firm* — Cantor Colburn LLP

(57) ABSTRACT

A power extraction system is provided and includes a low-pressure spool of a gas turbine engine, the low-pressure spool being rotatable at an input rotational speed between a first minimum speed and a first maximum speed, downstream components rotatable at an output rotational speed between a second minimum speed and a second maximum speed and a transmission assembly by which rotations of the low-pressure spool at the input rotational speed are transmittable at the output rotational speed to the downstream components. The transmission assembly includes clutches and a controller configured to control openings and closings of the clutches according to an upshifting algorithm whereby a torque applied by the downstream components is used to reduce the output rotational speed to an output speed of a gear into which the transmission assembly is shifting.

19 Claims, 2 Drawing Sheets

(56) References Cited

U.S. PATENT DOCUMENTS

2006/0137355 A1* 6/2006 Welch .................. B64D 41/007
                                                60/772
2008/0200299 A1* 8/2008 Russ ........................ F02C 7/32
                                                475/331
2019/0039454 A1* 2/2019 Duong ............... B60K 23/0808

* cited by examiner

TRANSMISSION SHIFT CONTROL METHOD FOR REDUCED TORQUE TRANSIENTS

BACKGROUND

The following description relates to transmissions and, more specifically, to a method of transmission shift control for reduced torque transients.

Modern engines are often configured as gas turbine engines in which combustible materials are combusted and the products of the combustion are directed into a turbine. Within the turbine, the products of the combustion are expanded whereupon the expanded products of combustion drive rotation of rotors. This occurs in a high-pressure spool (HS), which is associated with regions in which the products of combustion have relatively high pressures and high temperatures, and in a low-pressure spool (LS), which is associated with regions in which the products of combustion have relatively low pressures and low temperatures.

Recently, engine manufacturers have been attempting to transfer accessory power extraction from the HS to the LS. Doing so can be problematic, however, since a typical LS speed range (up to 10:1) does not necessarily align with a typical accessory speed range (~2.2:1). This issue has been addressed previously by the use of multi-speed shifting transmissions to condition LS output speeds but, in these cases, transmission shifts caused sudden speed changes to downstream components (i.e., generators). These sudden speed changes resulted in torque transients to the driveline components which, in turn, led to undesirable consequences including increased stress and wear, reduced life and dynamic responses.

BRIEF DESCRIPTION

According to an aspect of the disclosure, a power extraction system is provided and includes a low-pressure spool of a gas turbine engine, the low-pressure spool being rotatable at an input rotational speed between a first minimum speed and a first maximum speed, downstream components rotatable at an output rotational speed between a second minimum speed and a second maximum speed and a transmission assembly by which rotations of the low-pressure spool at the input rotational speed are transmittable at the output rotational speed to the downstream components. The transmission assembly includes clutches and a controller configured to control openings and closings of the clutches according to an upshifting algorithm whereby a torque applied by the downstream components is used to reduce the output rotational speed to an output speed of a gear into which the transmission assembly is shifting.

In accordance with additional or alternative embodiments, the gas turbine engine includes a high-pressure spool, which is rotatable by relatively high-pressure and high-temperature fluids, and the low-pressure spool, which is rotatable by relatively low-pressure and low-temperature fluids.

In accordance with additional or alternative embodiments, the downstream components include a generator and the torque applied by the downstream components includes drag torque.

In accordance with additional or alternative embodiments, the second minimum speed is greater than the first minimum speed.

In accordance with additional or alternative embodiments, the first minimum speed is between 2,000 and 4,000 rpm, the first maximum speed is greater than 18,000 rpm, the second minimum speed is between 6,000 and 8,000 rpm and the second maximum speed is about 16,000 rpm.

In accordance with additional or alternative embodiments, the transmission assembly includes an input shaft coupled to the low-pressure spool and an output shaft coupled to the downstream components and input torque is transmitted from the input shaft to the output shaft via the clutches.

In accordance with additional or alternative embodiments, the transmission assembly further includes sensors operably disposed to sense rotational speeds of the input and output shafts and the clutches include a first clutch and a second clutch which are controlled by the controller to open and close in an alternating sequence in accordance with readings of the sensors.

In accordance with additional or alternative embodiments, the output rotational speed is reduced to the output speed of the gear into which the transmission assembly is shifting at one of a substantially constant input rotational speed and a variable input rotational speed.

According to an aspect of the disclosure, a transmission assembly of a power extraction system is provided. The transmission assembly includes an input shaft coupled to a low-pressure spool of a gas turbine engine whereby rotations of the low-pressure spool between first minimum and maximum speeds drive input shaft rotations at an input rotational speed, an output shaft coupled to downstream components whereby output shaft rotations at an output rotational speed drive rotations of the downstream components between second minimum and maximum speeds, clutches by which the input shaft rotations at the input rotational speed drive output shaft rotations at the output rotational speed and a controller. The controller is configured to control openings and closings of the clutches according to an upshifting algorithm whereby a torque applied by the downstream components is used to reduce the output rotational speed to an output speed of a gear into which the transmission assembly is shifting.

In accordance with additional or alternative embodiments, the gas turbine engine includes a high-pressure spool, which is rotatable by relatively high-pressure and high-temperature fluids, and the low-pressure spool, which is rotatable by relatively low-pressure and low-temperature fluids.

In accordance with additional or alternative embodiments, the downstream components include a generator and the torque applied by the downstream components comprises drag torque.

In accordance with additional or alternative embodiments, the second minimum speed is greater than the first minimum speed.

In accordance with additional or alternative embodiments, the first minimum speed is between 2,000 and 4,000 rpm, the first maximum speed is greater than 18,000 rpm, the second minimum speed is between 6,000 and 8,000 rpm and the second maximum speed is about 16,000 rpm.

In accordance with additional or alternative embodiments, sensors are operably disposed to sense rotational speeds of the input and output shafts and the clutches include a first clutch and a second clutch which are controlled by the controller to open and close in an alternating sequence in accordance with readings of the sensors.

In accordance with additional or alternative embodiments, the output rotational speed is reduced to the output speed of the gear into which the transmission assembly is shifting at one of a substantially constant input rotational speed and a variable input rotational speed.

According to another aspect of the disclosure, a method of operating a power extraction system is provided. The power extraction system includes a low-pressure spool of a gas turbine engine, the low-pressure spool being rotatable at an input rotational speed between first minimum and maximum speeds, downstream components rotatable at an output rotational speed between second minimum and maximum speeds and a transmission assembly including clutches by which rotations of the low-pressure spool at the input rotational speed are transmittable at the output rotational speed to the downstream components. The method includes controlling openings and closings of the clutches according to an upshifting algorithm whereby a torque applied by the downstream components is used to reduce the output rotational speed to an output speed of a gear into which the transmission assembly is shifting.

In accordance with additional or alternative embodiments, the method further includes sensing the input and output rotational speeds and that the controlling is executed in accordance with the sensing.

In accordance with additional or alternative embodiments, the controlling includes closing a first one of the clutches in a first gear during a first ramping-up of the input rotational speed, opening the first one of the clutches at a first predefined output rotational speed, using the torque applied by the downstream components to reduce the output rotational speed to the output speed of a second gear, closing a second one of the clutches in the second gear when the output rotational speed reaches the output speed of the second gear and during a second ramping-up of the input rotational speed, opening the second one of the clutches at a second predefined output rotational speed and using the torque applied by the downstream components to reduce the output rotational speed to the output speed of a third gear.

In accordance with additional or alternative embodiments, the method further includes repeating a sequence of opening and closing the first and second ones of the clutches.

In accordance with additional or alternative embodiments, the method further includes using the torque applied by the downstream components to reduce the output rotational speed to the output speed of the gear into which the transmission assembly is shifting at one of a substantially constant input rotational speed and a variable input rotational speed.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, an upshifting methodology is provided where, instead of opening a first clutch pack while closing a second clutch pack (which would result in a torque transient due to the sudden speed change), a drag torque of a generator and/or other engine accessories is used to reduce an output speed of the transmission until the output speed matches the output speed of the gear that the transmission will shift into. Speed sensors on the transmission input and output are used in conjunction with algorithms to determine when to close the second clutch pack.

Figure 1:
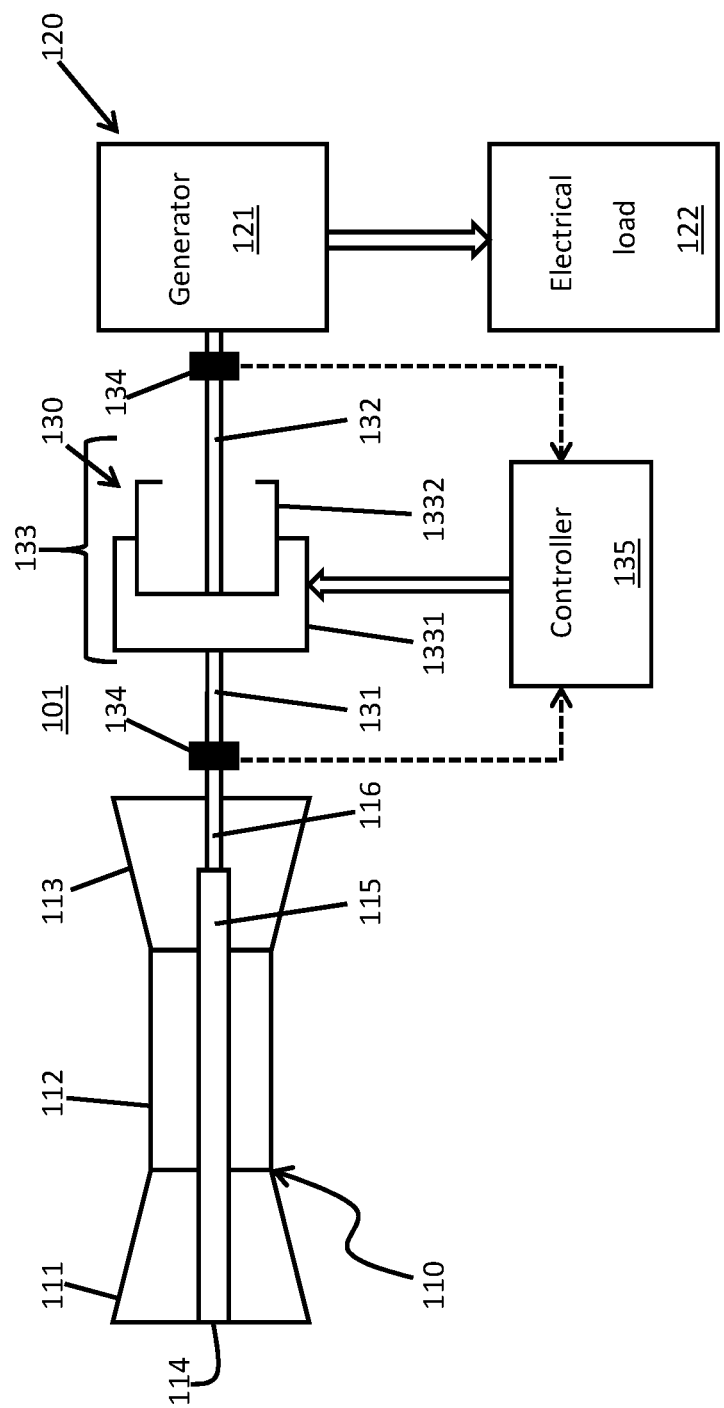
FIG. 1 is a schematic diagram of a transmission system in accordance with embodiments.

With reference to FIG. 1, a power extraction system 101 is provided and includes a gas turbine engine 110. The gas turbine engine 110 includes a compressor 111, which compresses inlet air, a combustor 112 in which the compressed inlet air is mixed with fuel and combusted to produce fluids in the form of products of the combustion and a turbine 113. Within the turbine 113, the fluids are expanded to drive rotations of a rotor 114. The rotations of the rotor 114 drives operations of the compressor 111. The rotor 114 can have a high-pressure spool (HS) 115 and a low-pressure spool (LS) 116. The HS 115 is rotatably driven in portions of the turbine 113 associated with an expansion of relatively high-pressure and high-temperature fluids and the LS 116 is rotatably driven in portions of the turbine 113 associated with an expansion of relatively low-pressure and low-temperature fluids. The LS 116 is thus rotatable at an input rotational speed defined inclusively between a first minimum speed and a first maximum speed.

The power extraction system 101 further includes downstream components 120 and a transmission assembly 130. The downstream components 120 are rotatable at an output rotational speed between a second minimum speed and a second maximum speed. The downstream components 120 can be provided, for example, as a generator 121. The generator 121 can be configured to generate electricity and can be coupled to an electrical load 122 that is receptive of and operated by the generated electricity. The electrical load 122 thus exerts or applies a torque (i.e., a drag torque) on the generator 121. The transmission assembly 130 is disposed and configured such that rotations of the LS 116 at the input rotational speed are transmittable at the output rotational speed to the downstream components 120.

Figure 2:
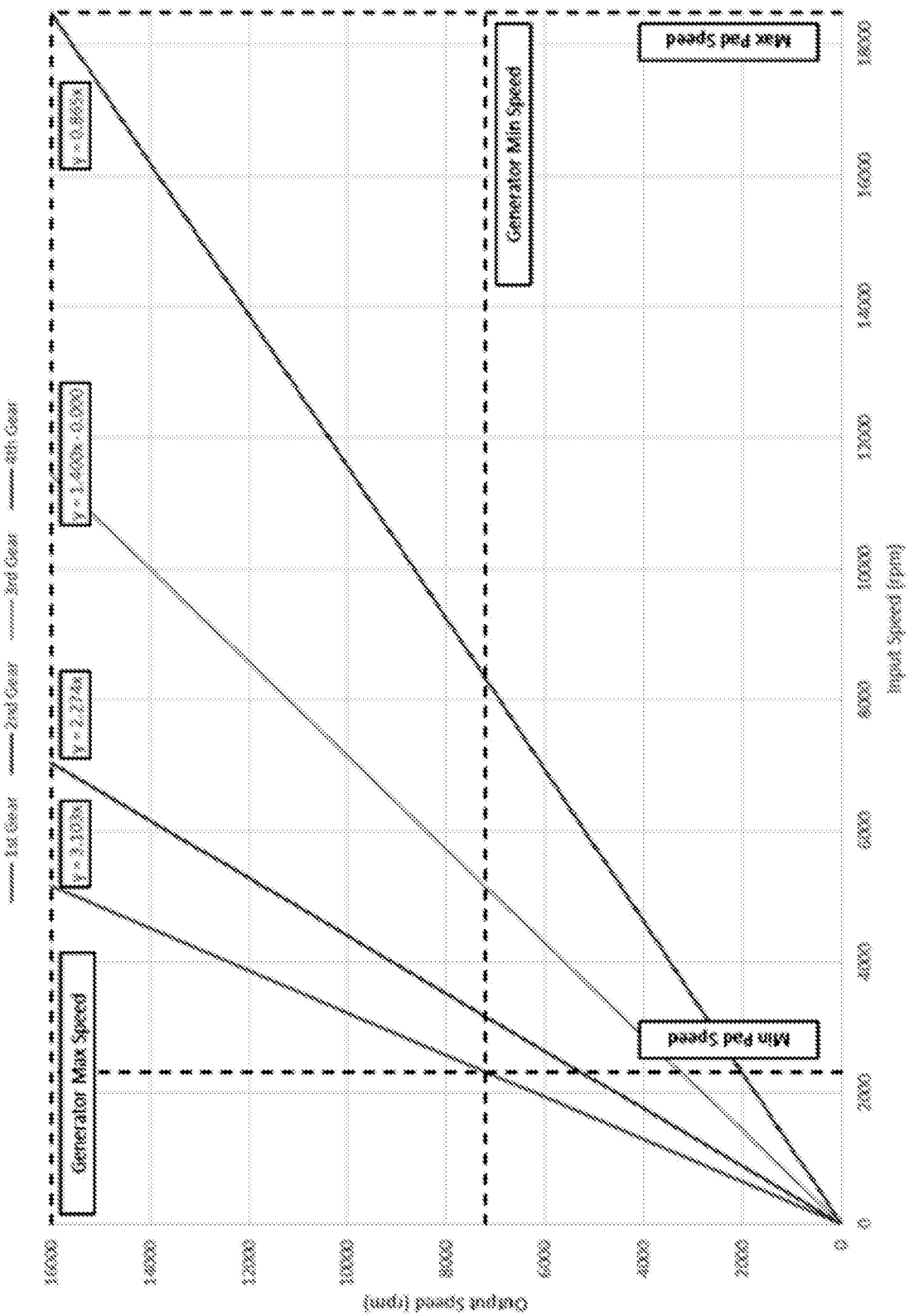
FIG. 2 is a graphical depiction of a transmission control method for reduced torque transients in accordance with embodiments.

With reference to FIG. 2 and, in accordance with embodiments, a range of the input rotational speed is about 8:1 between the first maximum speed and the first minimum speed whereas a range of the output rotational speed is about ~2.2:1 between the second maximum speed and the second minimum speed. As such, the second minimum speed can be, but is not required to be, greater than the first minimum speed and the second maximum speed can be, but is not required to be, less than the first maximum speed. In accordance with further embodiments, the first minimum speed can be between 2,000 and 4,000 rpm, the first maximum speed can be greater than 18,000 rpm, the second minimum speed can be between 6,000 and 8,000 rpm and the second maximum speed can be about 16,000 rpm.

With reference back to FIG. 1, the transmission assembly 130 includes an input shaft 131, an output shaft 132, clutches 133, sensors 134 and a controller 135. The input shaft 131 is coupled to the LS 116 such that input torque is applied to the input shaft 131 by the LS 116 and such that the input shaft 131 is rotated at the input rotational speed by the LS 116. The output shaft 132 is coupled to the downstream components 120 such that the output shaft 132 applies output torque to the downstream components 120 and such that the downstream components 120 are rotated at the output rotational speed by the output shaft 132. The input torque is transmitted from the input shaft 131 to the output shaft 132 via the clutches 133. The clutches 133 can include at least a first clutch 1331 and a second clutch 1332. The sensors 134 can be operably disposed on the input shaft 131 and the output shaft 132 to sense rotational speeds thereof. The controller 135 is configured to control openings and closings of the clutches 133 (i.e., to control the openings and closings of the first clutch 1331 and the second clutch 1332 in an alternating sequence) according to readings of the sensors 134 and according to an upshifting algorithm. According to the upshifting algorithm which is designed to control upshifts (i.e., from first gear to second gear, from second gear to third gear, etc.), the torque applied by the downstream components 120 (i.e., the drag torque) is used to reduce the output rotational speed to an output speed of a gear into which the transmission assembly 130 is shifting. This will be described in further detail with reference back to FIG. 2.

As shown in FIG. 2 and, in accordance with embodiments, an execution of the controlling of the openings and the closings of the clutches 133 will now be described. Initially, the first clutch 1331 is closed in a first gear during a first ramping-up of the input rotational speed (from 0 rpm to about 4,500 rpm) and is opened at a first predefined output rotational speed (at about 14,000 rpm). The drag torque applied by the downstream components 120 is then used to reduce the output rotational speed to the output speed of a second gear and the second clutch 1332 is closed in the second gear when the output rotational speed reaches the output speed of the second gear. The second clutch 1332 remains closed during a second ramping-up of the input rotational speed (from about 4,500 rpm to about 6,200 rpm) and is opened at a second predefined output rotational speed (at about 14,000 rpm). The drag torque applied by the downstream components 120 is then used to reduce the output rotational speed to the output speed of a third gear and the first clutch 1331 is closed in the third gear when the output rotational speed reaches the output speed of the third gear. The first clutch 1331 remains closed during a third ramping-up of the input rotational speed (from about 6,200 rpm to about 8,700 rpm) and is opened at a second predefined output rotational speed (at about 12,500 rpm). The drag torque applied by the downstream components 120 is then used to reduce the output rotational speed to the output speed of a fourth gear and the second clutch 1332 is closed in the fourth gear when the output rotational speed reaches the output speed of the fourth gear. The second clutch 1332 remains closed during a fourth ramping-up of the input rotational speed (from about 8,700 rpm to about 18,000 rpm).

As shown in FIG. 2, the output rotational speed can be reduced to the output speed of the gear into which the transmission assembly 130 is shifting at one of a substantially constant input rotational speed (see, e.g., the upshifts from the first gear to the second gear and from the second gear to the third gear) and a variable input rotational speed (see, e.g., the upshift from the third gear to the fourth gear).

Technical effects and benefits of the disclosure are the provision of minimal speed changes during upshifts resulting in reduced torque transients. This leads to reduced torque transients that are passed on to downstream components and results in increased life and reliability of the downstream and transmission driveline components. The shifting methodology also results in reduced slippage and wear of the transmission clutch components.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:
1. A power extraction system, comprising:
a low-pressure spool of a gas turbine engine, the low-pressure spool being rotatable at an input rotational speed between a first minimum speed and a first maximum speed;
downstream components rotatable at an output rotational speed between a second minimum speed and a second maximum speed; and
a transmission assembly by which rotations of the low-pressure spool at the input rotational speed are transmittable at the output rotational speed to the downstream components,
the transmission assembly comprising first and second clutches and a controller configured to control openings and closings of the clutches according to an upshifting algorithm whereby a torque applied by the downstream components is used to reduce the output rotational speed to an output speed of a gear into which the transmission assembly is shifting by:
closing the first clutch in a first gear during a first ramping-up of the input rotational speed, opening the first clutch at a first predefined output rotational speed, using the torque applied by the downstream components to reduce the output rotational speed to the output speed of a second gear, closing the second clutch in the second gear when the output rotational speed reaches the output speed of the second gear and during a second ramping-up of the input rotational speed, opening the second clutch at a second predefined output rotational speed and using the torque applied by the downstream components to reduce the output rotational speed to the output speed of a third gear.

2. The power extraction system according to claim 1, wherein the gas turbine engine comprises:
a high-pressure spool, which is rotatable by relatively high-pressure and high-temperature fluids; and
the low-pressure spool, which is rotatable by relatively low-pressure and low-temperature fluids.

3. The power extraction system according to claim 1, wherein the downstream components comprise a generator and the torque applied by the downstream components comprises drag torque.

4. The power extraction system according to claim 1, wherein the second minimum speed is greater than the first minimum speed.

5. The power extraction system according to claim 1, wherein the first minimum speed is between 2,000 and 4,000 rpm, the first maximum speed is greater than 18,000 rpm, the second minimum speed is between 6,000 and 8,000 rpm and the second maximum speed is about 16,000 rpm.

6. The power extraction system according to claim 1, wherein:
the transmission assembly comprises an input shaft coupled to the low-pressure spool and an output shaft coupled to the downstream components, and input torque is transmitted from the input shaft to the output shaft via the clutches.

7. The power extraction system according to claim 6, wherein:
the transmission assembly further comprises sensors operably disposed to sense rotational speeds of the input and output shafts.

8. The power extraction system according to claim 1, wherein the output rotational speed is reduced to the output speed of the gear into which the transmission assembly is shifting at one of a substantially constant input rotational speed and a variable input rotational speed.

9. A transmission assembly of a power extraction system, the transmission assembly comprising:
an input shaft coupled to a low-pressure spool of a gas turbine engine whereby rotations of the low-pressure spool between first minimum and maximum speeds drive input shaft rotations at an input rotational speed;
an output shaft coupled to downstream components whereby output shaft rotations at an output rotational speed drive rotations of the downstream components between second minimum and maximum speeds;
clutches by which the input shaft rotations at the input rotational speed drive output shaft rotations at the output rotational speed; and
a controller configured to control openings and closings of the clutches according to an upshifting algorithm whereby a torque applied by the downstream components is used to reduce the output rotational speed to an output speed of a gear into which the transmission assembly is shifting by:
closing a first one of the clutches in a first gear during a first ramping-up of the input rotational speed, opening the first one of the clutches at a first predefined output rotational speed, using the torque applied by the downstream components to reduce the output rotational speed to the output speed of a second gear, closing a second one of the clutches in the second gear when the output rotational speed reaches the output speed of the second gear and during a second ramping-up of the input rotational speed, opening the second one of the clutches at a second predefined output rotational speed and using the torque applied by the downstream components to reduce the output rotational speed to the output speed of a third gear.

10. The transmission assembly according to claim 9, wherein the gas turbine engine comprises:
a high-pressure spool, which is rotatable by relatively high-pressure and high-temperature fluids; and
the low-pressure spool, which is rotatable by relatively low-pressure and low-temperature fluids.

11. The transmission assembly according to claim 9, wherein the downstream components comprise a generator and the torque applied by the downstream components comprises drag torque.

12. The transmission assembly according to claim 9, wherein the second minimum speed is greater than the first minimum speed.

13. The transmission assembly according to claim 9, wherein the first minimum speed is between 2,000 and 4,000 rpm, the first maximum speed is greater than 18,000 rpm, the second minimum speed is between 6,000 and 8,000 rpm and the second maximum speed is about 16,000 rpm.

14. The transmission assembly according to claim 9, wherein:
sensors are operably disposed to sense rotational speeds of the input and output shafts.

15. The transmission assembly according to claim 9, wherein the output rotational speed is reduced to the output speed of the gear into which the transmission assembly is shifting at one of a substantially constant input rotational speed and a variable input rotational speed.

16. A method of operating a power extraction system, comprising:
a low-pressure spool of a gas turbine engine, the low-pressure spool being rotatable at an input rotational speed between first minimum and maximum speeds;
downstream components rotatable at an output rotational speed between second minimum and maximum speeds; and
a transmission assembly comprising clutches by which rotations of the low-pressure spool at the input rotational speed are transmittable at the output rotational speed to the downstream components,
the method comprising controlling openings and closings of the clutches according to an upshifting algorithm whereby a torque applied by the downstream components is used to reduce the output rotational speed to an output speed of a gear into which the transmission assembly is shifting,
wherein the controlling comprises closing a first one of the clutches in a first gear during a first ramping-up of the input rotational speed, opening the first one of the clutches at a first predefined output rotational speed, using the torque applied by the downstream components to reduce the output rotational speed to the output speed of a second gear, closing a second one of the clutches in the second gear when the output rotational speed reaches the output speed of the second gear and during a second ramping-up of the input rotational speed, opening the second one of the clutches at a second predefined output rotational speed and using the torque applied by the downstream components to reduce the output rotational speed to the output speed of a third gear.

17. The method according to claim 16, further comprising sensing the input and output rotational speeds, wherein the controlling is executed in accordance with the sensing.

18. The method according to claim 16, further comprising repeating a sequence of opening and closing the first and second ones of the clutches.

19. The method according to claim 16, further comprising using the torque applied by the downstream components to reduce the output rotational speed to the output speed of the gear into which the transmission assembly is shifting at one of a substantially constant input rotational speed and a variable input rotational speed.

\* \* \* \* \*